United States Patent Office 3,481,933
Patented Dec. 2, 1969

3,481,933
RECOVERY AND PURIFICATION OF PIPERAZINE
Rocco L. Mascioli, Media, Pa., assignor to Air Products and Chemicals, Inc., Philadelphia, Pa., a corporation of Delaware
No Drawing. Filed May 3, 1967, Ser. No. 635,706
Int. Cl. C07d 51/64; C07c 31/12
U.S. Cl. 260—268                                    10 Claims

ABSTRACT OF THE DISCLOSURE

Piperazine is recovered quantitatively, and in high purity, from mixtures containing it, along with other nitrogenous compounds. Method disclosed relies upon the unique insolubility of piperazine hexahydrate, in aqueous mixtures of amines and particular alcohols.

BACKGROUND OF THE INVENTION

Field of the invention

This invention relates to the separation of piperazine from mixtures containing a plurality of nitrogenous compounds. More particularly, it relates to the separation of piperazine, as piperazine hexahydrate, from mixtures containing piperazine along with other nitrogenous compounds containing at least one amine nitrogen including, for example, piperazine derivatives, alkyl amines, alkylene amines, alkanolamines, morpholines and pyridenes.

Description of the prior art

Many reactions for the production of amines result in mixtures of primary, secondary and tertiary amines as well as derivatives thereof. This is especially true of common methods used for the preparation of piperazine (i.e. diethylene diamine). These methods often yield piperazine-containing streams which also contain nitrogenous compounds such as, for example, substituted piperazine, pyrazine, substituted pyrazines, polyethylene polyamines, ethylene diamine and the like.

Other processes, intended for the production of amine derivatives also produce side streams rich in piperazine. For instance, in U.S. Patent No. 3,123,607 a process is disclosed for the recovery of diazabicyclo-octane which has been made by the vapor phase reaction of alkylene polyamines, having from 2 to 10 carbon atoms, particularly diethylene triamine, over solid acidic catalysts at temperatures in the range of about 300–500° C. In the method of recovery described in the aforementioned patent, a fraction is obtained (see col. 3 lines 30–35 under heading "A—With Additive") which distills over in the range of 130° C. to 165° C. and which contains 0.4 percent 1,4-diazabicyclo-(2,2,2)-octane and 10.2 percent piperazine. If this fraction is admixed with water, a phase separation occurs and the lower water phase contains a high percentage of piperazine and other water soluble amines. The method of this invention is particularly suitable for recovering piperazine from such water phase compositions and they will be referred to henceforth herein as "eutectic" reaction mixtures.

Several methods have been utilized in the past for separation of amines from each other. In general these methods have depended on whether the amine has been a primary, secondary or tertiary amine.

For example, if an amine mixture is treated with diethyl oxalate, primary amines are converted to a water-soluble dioxamide; secondary amines to a water-insoluble ester amide, which may be filtered off; and tertiary amines are unaffected and may therefore be isolated by distillation.

Another method makes use of the reaction of benzene sulfonyl chloride with amines in the presence of alkalies.

All of these reactions and others which may be found in the literature, inter alia, at page 430 et seq. of "Organic Synthesis" by Vartkes Migrdichian, vol. 1 (Reinhold, 1957) rely upon whether the amines are primary, secondary or tertiary. Consequently, these methods present no basis for separation of amines of the same degree (i.e. primary, secondary, tertiary), one from another.

In the U.S. Patent No. 2,950,282 a method is disclosed for separation of diazabicyclo-octane from reaction mixtures, containing it and piperazine, by forming a hydrate of diazabicyclo-octane. This is done with or without the addition of an aliphatic hydrocarbon having a boiling point under about 150° C. While it is suggested that the method has application in the purification of piperazine, this has not proven the case.

Accordingly, there has been a need for a method of separating piperazine from other amines, particularly those found in the eutectic mixtures described above.

SUMMARY OF THE INVENTION

The invention provides a process whereby the amine, piperazine (i.e. diethylene diamine), may be separated from mixtures of amines. The basis for the separation is the singular ability of piperazine to form a stable polyhydrate wherein water represents a significant percent of the weight of the molecule. The polyhydrate, piperazine hexahydrate, has a molecular weight of 194.23 with the water of hydration having a molecular weight of 108 and, consequently, constituting about 55.7 percent of the total weight of the molecule.

The process comprises the steps of adding water to the mixture until all of the amines are in solution. The amount of water added is preferably enough to permit conversion of substantially all piperazine to piperazine hexahydrate. If an aqueous mixture is utilized, the water already present helps satisfy the stoichiometric water requirement.

To this aqueous solution is added a relatively water-insoluble alcohol preferably containing at least 4 carbon atoms. A solubility in water (at 20° C.) of less than 8% is preferred. The amount added is preferably at least equal in weight to the piperazine in the mixture. Particularly suited are alcohols such as, for example, iso-octanol, butanol, 1-hexanol, and the like. Alcohols which are completely soluble in water are unsuitable. Piperazine hexahydrate is relatively insoluble in the types of alcohols described above. Consequently, it precipitates from the aqueous solution in high purity and in high yield. The precipitate may be separated and further purified using techniques such as crystallization, solvent washing and recrystallization.

It is, accordingly, an object of the invention to provide a method of separating a piperazine from a mixture of nitrogenous compounds each containing at least one amine nitrogen which mixture may include not only the desired amine but also, for example, a variety of water soluble amines and derivatives thereof, such as, for example, alkyl amines, alkylene amines, alkanolamines, morpholines and pyridines and particularly those amines found in the eutectic mixtures described above.

PREFERRED EMBODIMENT OF THE INVENTION

The following non-limiting examples are intended to illustrate the nature and advantages of the invention.

Example 1

To a 83 gram sample of an eutectic reaction mixture containing 30.3 grams of piperazine and 30.5 grams of water were added another 14 grams of water. This quantity of water resulted in a water/piperazine mol ratio of 7.0, more than sufficient to form the hexahydrate.

To the 97 grams of aqueous solution were added 54 grams of isooctanol. A precipitate weighing 71.0 grams was obtained which, on analysis, was found to contain 41.2% (29.2 grams) of piperazine. Thus, 96.4% of the piperazine present was recovered.

Example 2

In order to illustrate the necessity for using alcohol in the process of the invention, 561 grams of an eutectic reaction mixture, derived from a reaction in which ethylene diamine was passed, in vapor phase, over a solid acidic cracking catalyst at a temperature in the range of about 300° C. to 500° C. were utilized. The sample contained 204 grams of piperazine and 206 grams of water, the balance comprising a plurality of nitrogen compounds, each containing at least one amine nitrogen, such as piperazine derivatives and alkyl amines. To this sample were added 50 grams of water so that the water/piperazine mol ratio was 6, that theoretically required for the hexahydrate.

No alcohol was added but after stirring, 318 grams of a precipitate were recovered. On analysis, the precipitate was found to contain 40% piperazine (127 grams) and the recovery, in consequence, was but 62.2%.

Example 3

To 194.8 grams of the material used in Example 2, which contained 71.1 grams of piperazine and 71.7 grams of water, were added 25.7 grams of water. The consequent water/piperazine mol ratio was 6.5.

To 220.5 grams of the aqueous solution were added 120.3 grams of isooctanol. After stirring, a precipitate was recovered which weighed 153 grams. On analysis, the precipitate was found to contain 43.5% piperazine (66.6 grams) and the recovery was 93.7%—a recovery which was about 51% better than the recovery in Example 2.

Example 4

A mixture of nitrogenous compounds having the following components in the following weight percentages was treated: ethylene diamine 4.9; pyrazine and dimethyl piperazine 1.4; xylenes 2.5; N-methylpiperazine 3.3; methylpyrazine 1.9; piperazine 36.5; methylpiperazine and dimethylpyrazine 6.5; dimethylpiperazine 2.3; methyl ethyl pyrazine 0.3; triethylene diamine 1.6; N-aminoethyl piperazine 1.9; alkylamines, alkanolamines and morpholines 0.8; and water 36.1. To 194.8 grams of this mixture containing 71.1 grams of piperazine, 71.1 grams of water and water soluble amines as indicated above, were added 25.7 grams of water and 120.3 grams of isooctanol.

The mixture was warmed to 72° C., then cooled and filtered to remove the precipitate. The precipitate was washed with hot benzene, recrystallized and washed with 250 ml. of pentane. The solids were then dried in a vacuum oven and the recovered material weighed at 153 grams. The precipitate contained 66.6 grams of piperazine, as the hexahydrate, a recovery of 93.6%.

Example 5

To a 100 gram sample of a eutectic reaction mixture of piperazine and other water-soluble amines, containing 36.5 grams of piperazine, and 36.8 grams of water were added 53.8 grams of water to give a water-piperazine mol ratio of 7.0. To this mixture were added 65 grams of n-butanol.

The manipulative techniques described in Example 4 were followed to obtain 74 grams of a precipitate containing 43.4 weight percent piperazine. Recovery was 85.5%.

Example 6

To another 100 gram sample of the same starting material used in Example 5 were added 17 grams of water and 65 grams of n-hexanol.

The manipulative techniques of Example 4 were again followed to obtain 18.5 grams of a precipitate containing 40.8 weight percent piperazine. Recovery was 98.8%.

Example 7

A mixture of piperazine and nitrogen compounds containing amine nitrogen was prepared, having the following composition.

| | Grams |
|---|---|
| Dicyclohexylamine | 10 |
| 2-diethylaminoethanol | 40 |
| Di-N-butylamine | 20 |
| Morpholine | 30 |
| Ethylamine (70% in water) | 10 |
| Butylamine | 10 |
| Trimethylamine (25% in water) | 10 |
| Pyridine | 30 |
| Piperazine | 40 |

To this amine mixture were added 50 g. water and 100 g. isooctanol. While stirring the mixture was warmed to 40° C. and then cooled to 15° C. A precipitate was obtained which was filtered and washed twice with 200 ml. of pentane. The precipitate weighed 80 grams after drying in a vacuum oven at 36° C. for one hour. The following analysis was obtained by gas chromatography:

| | Percent |
|---|---|
| Piperazine | 42.6 |
| $H_2O$ | 53.6 |
| Unidentified | 1.1 |
| Occluded isooctanol | 2.7 |

On the basis of this data recovery was 85.3%. It should be noted that dibutylamine and dicyclohexylamine, both of which are but slightly soluble in water, did not interfere with the piperazine recovery.

Example 8

A mixture of piperazine and compounds containing amine nitrogen was prepared having the following composition.

| | Grams |
|---|---|
| Ethylamine (70% in water) | 20 |
| Morpholine | 20 |
| Pyridine | 20 |
| Butylamine | 20 |
| Aminoethylpiperazine | 10 |
| Diethylenetriamine | 10 |
| Triethanolamine | 10 |
| Piperazine | 60 |

To this amine mixture were added 72 grams of water and 150 grams of isooctanol. The mixture was stirred and warmed to 42° C. After cooling to 15° C. and seeding with a crystal of the polyhydrate obtained in Example 7, solids precipitated. These were filtered and washed twice with 200 ml. of pentane. 111 grams of solids were recovered after drying in a vacuum oven for two hours at 35° C. The following analysis was obtained by gas chromatography:

| | Percent |
|---|---|
| Piperazine | 39.4 |
| Water | 50.8 |
| Unidentified | 2.0 |
| Occluded isooctanol | 7.8 |

On the basis of this data recovery was 72.8%.

Washing the precipitate with a hydrocarbon solvent such as pentane tends to remove adhering alcohol and improve the product.

Obviously, many modifications and variations of the invention as hereinbefore set forth may be made without departing from the spirit and scope thereof. Therefore, only such limitations should be imposed as are indicated in the appended claims.

I claim:
1. In a process for the selective recovery of piperazine as a polyhydrate from mixtures containing, in addition to piperazine, a plurality of other nitrogenous compounds each containing at least one amine nitrogen, the improvement which comprises the steps of:
(a) adding water to said mixture
(b) admixing an alcohol which is limitedly soluble in water, and
(c) recovering from said mixture, as a precipitate, piperazine polyhydrate.

2. The process of claim 1 wherein the amount of water added is stoichiometrically sufficient to permit conversion of all piperazine in said mixture into piperazine hexahydrate.

3. The process of claim 1 wherein said alcohol contains at least 4 carbon atoms.

4. The process of claim 3 wherein the amount of water added is stoichiometrically sufficient to permit conversion of all piperazine in said mixture into piperazine hexahydrate.

5. The process of claim 4 wherein said alcohol has a solubility in water, measured at 20° C., which is less than 8.0% by weight.

6. The process of claim 5 wherein the piperazine containing mixture derives from a reaction in which an alkylene-polyamine having 2 to 10 carbon atoms is passed, in vapor phase, over a solid acidic cracking catalyst at a temperature in the range of about 300° C. to 500° C.

7. The process of claim 6 wherein said alcohol is isooctanol.

8. The process of claim 6 wherein said alcohol is n-hexanol.

9. The process of claim 6 wherein said alcohol is n-butanol.

10. The process of claim 6 wherein the purity of said piperazine hexahydrate is increased by washing it with a solvent to remove any adhering alcohol.

References Cited

UNITED STATES PATENTS

| | | | |
|---|---|---|---|
| 2,832,783 | 4/1958 | Petrow et al. | 260—268 |
| 3,038,904 | 6/1962 | Godfrey | 260—268 |

FOREIGN PATENTS 628,537  9/1952  Great Britain.

DONALD G. DAUS, Primary Examiner

U.S. Cl. X.R.

260—247, 250, 290, 578, 632